June 12, 1923.                                                                  1,458,315
L. A. BABCOCK
FRUIT DISINTEGRATING MACHINE
Filed Aug. 21, 1919                    2 Sheets-Sheet 1
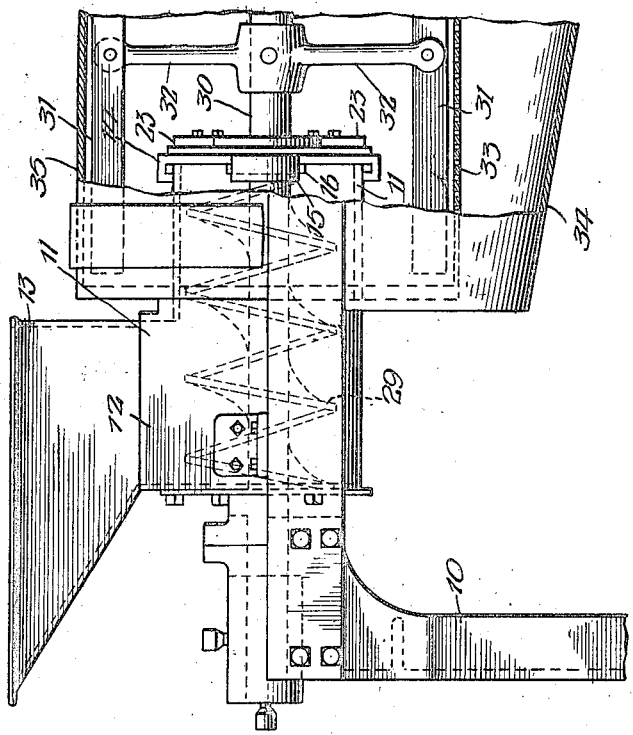

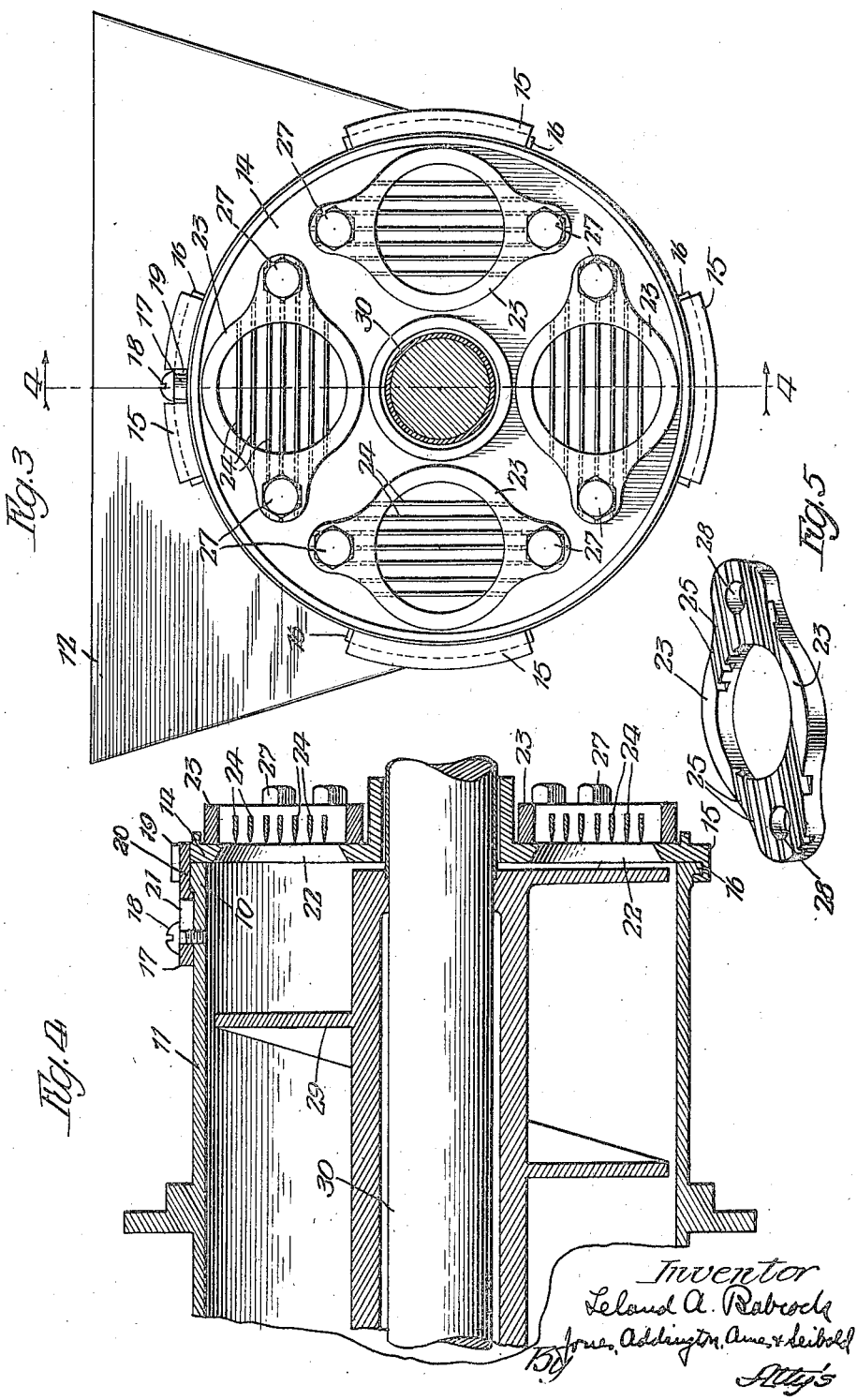

Patented June 12, 1923.

1,458,315

UNITED STATES PATENT OFFICE.

LELAND A. BABCOCK, OF CHICAGO, ILLINOIS, ASSIGNOR TO SPRAGUE CANNING MACHINERY COMPANY, OF CHICAGO, ILLINOIS, A CORPORATION OF ILLINOIS.

FRUIT-DISINTEGRATING MACHINE.

Application filed August 21, 1919. Serial No. 318,911.

*To all whom it may concern:*

Be it known that I, LELAND A. BABCOCK, a citizen of the United States, residing at Chicago, in the county of Cook and State of Illinois, have invented new and useful Improvements in Fruit-Disintegrating Machines, of which the following is a full, clear, concise, and exact description, reference being had to the accompanying drawing, forming a part of this specification.

My invention relates to fruit disintegrating machines, and particularly to a cutting device adapted for use in machines of this character.

The object of my invention is the production of a fruit disintegrating machine, through the medium of which fruit or other material to be acted upon may be disintegrated or cut up efficiently and with great expedition.

A still further object is the production of a machine of the character mentioned which will be of durable and economical construction, one which may be readily and easily taken apart to repair or replace disabled parts, one which may be readily maintained in clean and sanitary condition, and one which will not be susceptible to readily becoming inoperative.

Other objects will appear hereinafter.

With these objects in view the invention consists in the combinations and arrangements of parts which will be described in the foregoing, and particularly pointed out in the appended claim.

The invention will be best understood by referring to the accompanying drawings which form a part of this specification, and in which—

Fig. 1 is a partially sectional side elevation of one end of a fruit disintegrating machine embodying the invention;

Fig. 2 is an end elevation of the construction seen in Fig. 1;

Fig. 3 is an end elevation of the cutter head included in the invention;

Fig. 4 is a section taken on substantially line 4—4 of Fig. 3; and

Fig. 5 is a perspective view of one of the knife holders detached.

The preferred form of construction as illustrated in the drawings comprises a base 10, upon which, at one end, is suitably mounted a horizontally disposed substantially cylindrical housing 11. Said housing is provided at one end with an upwardly opening inlet 12 with which communicates a hopper 13 into which the fruit to be acted upon is deposited during operation of the machine.

The opposite end of housing 11 is open, and arranged thereover is a cutter head comprising a circular plate or carrier 14, as clearly seen in Figs. 3 and 4. The plate 14 is in detachable bayonet-joint connection with the housing 11, said plate and housing being provided with spaced interlocking flanges 15 and 16 respectively.

The arrangement is such, as will be seen, that detachment of plate 14 may be effected by simply rotating the same to a position in which the flanges 15 thereof are positioned out of registration with flanges 16, in which event said plate 14 will be free permitting of removal thereof from housing 11. Said flanges 15 and 16 are locked in interlocking relation by means of a key or finger 17 secured by a screw 18 to the upper side of housing 11, said key being adapted to engage with registering notches 19 and 20 provided respectively in flanges 15 and 16 at the upper side of said housing, as clearly seen in Figs. 3 and 4. The key 17 is formed with an elongated slot 21 so as to permit of the same being slid back from engagement with flanges 15 and 16 when it is desired to rotate member 14 in effecting detachment thereof as above set forth.

Formed in the plate 14 adjacent the periphery thereof is a plurality of spaced symmetrically arranged circular openings 22 through which, in the operation of the machine, the material to be treated is adapted to pass. Arranged upon the outer side of member 14 in registration with each of the openings 22, is a cutting element comprising a knife holder or body 23 and a plurality of spaced parallel knives 24. Each holder 23 is formed at one side with spaced parallel slots 25 for the reception of the ends of the knives 24 carried thereby, said ends of said knives being pressed into engagement with said slots whereby the same are securely held in operative position. Said knives are further securely locked in position in the holders 23 by reason of the fact that the slotted sides of said holders are faced toward the member 14, the latter thus serving as a stop for the knives and preventing disengagement thereof from the slots engaged thereby.

The holders 23 are secured to the plate 14 by screws 27 which pass through openings 28 provided for the reception thereof at opposite sides of each of said holders, the inner ends of said screws being adapted to engage with suitable threaded openings provided for the reception thereof in member 14.

The arrangement is such that any material passing through the openings 22 will be forced into engagement with the stationary knives 24 which will serve to cut the material into small pieces or sections, as will be readily understood. The material is forced through the openings 22 and into engagement with the knives 24, as mentioned, by means of a worm 29 arranged in housing 11 and carried by a rotary shaft 30 which extends axially through said housing and through the plate 14 as clearly seen in Fig. 4.

The arrangement is such that, in the operation of the machine, the material introduced into the hopper 13 will be conveyed or fed longitudinally in the housing 11 by worm 29 and thence forced thereby through the openings 22 into engagement with the knives 24 as above pointed out. After passing through the spaces between said knives and from engagement with the latter, the divided or cut up material is caught up by elongated revolving paddles 31 carried by arms 32 secured to the shaft 30 and whipped thereby against a screen 33 through which the juice contained in the material will pass into a drain pan or receiving receptacle 34, the dross being discharged through the opposite end of the machine. The screen 33 is semi-cylindrical in form and closes only the lower portion of the paddle element, the upper portion of said element being enclosed by a suitable housing 35.

With the construction set forth, an arrangement is provided for effectively and expeditiously disintegrating or pulping the fruit or material acted upon, the machine being especially adapted for use in connection with tomatoes, pumpkins, squash, sweet potatoes, apples, prunes, figs, oranges, grape fruit and the like. The machine is of simple construction, permitting of the same being readily taken apart for replacement or repair of broken or disabled parts, sharpening of the knives, or to facilitate cleaning, whereby the machine may be readily kept in sanitary condition.

While I have illustrated and described the preferred form of construction for carrying my invention into effect, this is capable of variation and modification without departing from the spirit of the invention. I therefore do not wish to be limited to the precise details of construction set forth, but desire to avail myself of such variations and modifications as come within the scope of the appended claim.

Having thus described my invention, what I claim as new and desire to secure by Letters Patent is:

In a cutting device of the class described, a housing having a plurality of openings; a plurality of cutting elements arranged in registration with said openings, each of said cutting elements being a separate and independent unitary structure mounted upon the outer side of said housing and comprising an annular holder and knives mounted in said holder; and means for forcing the material to be cut through said cutting elements.

In witness whereof, I have hereunto subscribed my name.

LELAND A. BABCOCK.

Witnesses:
GEO. GLASS,
JOHN L. FREEMAN.